Figure 1:
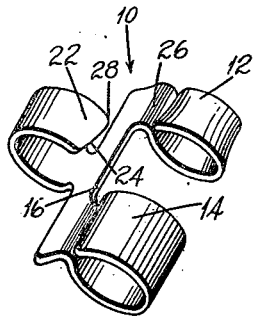

July 3, 1945. J. M. EWART 2,379,510

DISINTEGRATING CARTRIDGE BELT

Filed Sept. 10, 1942

INVENTOR:
John M. Ewart
By his attorney

Patented July 3, 1945

2,379,510

UNITED STATES PATENT OFFICE 2,379,510

DISINTEGRATING CARTRIDGE BELT

John M. Ewart, Beverly, Mass., assignor to United Shoe Machinery Corporation, Flemington, N. J., a corporation of New Jersey Application September 10, 1942, Serial No. 457,852

3 Claims. (Cl. 89—35)

This invention relates to cartridge belts of the disintegrating type, intended for feeding cartridges to a machine gun or rifle, and more particularly to an improved link for such belts, especially adapted to facilitate the quick extension of a belt by the application of an additional section thereto without the necessity of extracting a cartridge from either of the sections to be connected or finding and inserting an additional cartridge to establish the connection.

The standard cartridge belt, used, for example, in a caliber .50 machine gun, comprises a series of identical metallic links adapted to be joined by the cartridges, which constitute pintles between the links. These links have rings in which the cartridges fit tightly enough to ensure their retention during ordinary handling and feeding of the belt into the gun but not so tightly as to prevent the mechanism of the gun from extracting a cartridge from the belt by withdrawing the cartridge in the direction of its own longitudinal axis. When it is desired to connect a new section of belt to the trailing end of a belt from which most of the rounds have been fired, this is done by interengaging and aligning the rings of the endmost links of the two belt sections and forcing a cartridge into the said rings to effect the connection. This operation, which consumes some time and requires a certain amount of care and deftness, may have to be performed in the haste and excitement of combat and is rendered difficult by the fact that the gunner is usually wearing heavy gloves, by which he is considerably handicapped in the accurate handling of small objects.

It is the object of the present invention to provide a novel terminal link by the use of which two cartridge belt sections can be almost instantaneously connected, by a single motion, without any delicate manipulation and, consequently, with ease and certainty, even through the gunner may be wearing gloves or his fingers may be numbed by cold.

Broadly, this object is accomplished by providing at one end, at least, of each cartridge belt section a link which is capable of sliding directly into operative position upon the endmost cartridge already in a belt to which said section is to be connected.

More specifically, my novel terminal link may comprise a central, single ring which is slotted adjacent to the bridge portion connecting it to a complemental pair of spaced apart rings at the opposite side like those of the standard link, the slot being sufficiently wide to permit that part of the link which connects one of the rings of said pair to the bridge in a similar link to pass through the slot so that the slotted ring can be slid lengthwise upon a cartridge, over one of the rings of a pair already upon the cartridge and into the space between the two rings of the pair, which is the position it normally occupies in the belt.

The material of which such links are made, although quite stiff, is resilient and the slot is preferably so tapered that, when the slotted ring is pushed over the above-mentioned connecting part of the link already upon the cartridge, it will be sprung open slightly and will then snap into the space which it finally occupies and from which it cannot be removed without withdrawing the cartridge.

Figure 2:
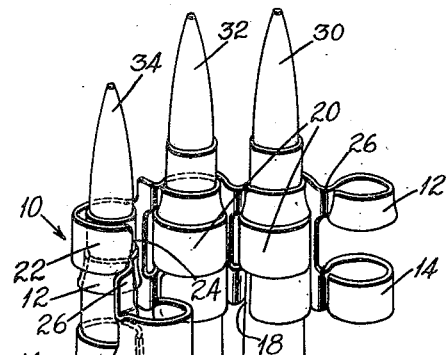
Figure 3:
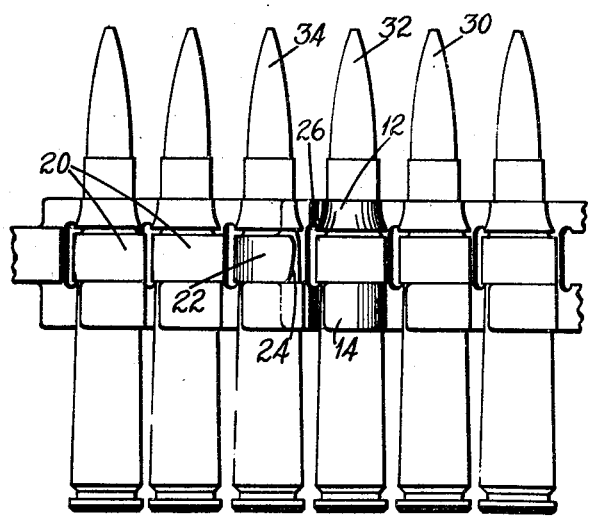

The above and other features of the invention and benefits afforded thereby will be better understood and appreciated from reading the following detailed description of one embodiment thereof in connection with the accompanying drawing, in which, Fig. 1 is a perspective view of a cartridge belt link embodying the invention;

Fig. 2 is a perspective view showing how two sections of belt are joined when a link embodying the invention is used; and Fig. 3 is a view in elevation showing portions of two sections of belt joined by my novel link.

Referring now to the drawing, 10 indicates generally a link formed of resilient sheet metal, of heavy enough gage to be quite stiff and able to withstand the rather strong pull to which such links are subjected in normal use, without stretching or becoming deformed sufficiently to interfere with the feeding of the cartridges by the feeding mechanism embodied in a machine gun. Similar links are regularly used in the standard cartridge belt used in caliber .50 machine guns, and machinery for their manufacture in great quantities is available.

The illustrated link comprises a pair of coaxial rings 12 and 14 spaced apart, as shown, and connected by a bridge portion 16 from the opposite side of which projects a complemental central, single ring of a width slightly less than that of the space between the rings 12 and 14, the axis of the single ring being parallel to that of the pair. The rings 12 and 14 are normally held closed by the resiliency of the metal of which the link is made, but the ring 14 is of such size that when a cartridge is pushed into it the ring will be expanded slightly, so that it will grip the case firmly, leaving a slight gap in the ring, as shown at 18 in Fig. 2. The ring 12 is smaller than the ring 14 and is tapered, as shown, to fit the reduced neck portion and abut against the shoulder of the cartridge case. This fit is such that the ring 12 does not grip the shell and is not expanded thereby, the grip of the ring 14 being relied upon to hold the cartridge in the link.

In the regulation link, the central single ring extending oppositely from the above-described pair of rings is also a closed ring and is of such diameter, slightly greater than that of the ring 14, that it fits quite loosely upon the cartridge case in the space between the rings 12 and 14 of another link. Such central rings are shown at 20 in Figs. 2 and 3.

When connecting two sections of belt made up with regulation links, it is the practice to fit the single ring 20 at the end of one section into the space between the rings 12 and 14 at one end of the other section, and then, while holding the three rings in alignment, to force a cartridge through all three, thus effecting the connection. As heretofore explained, this operation is sometimes difficult and, when it must be performed during active combat, it may consume enough time to allow an enemy target to get out of range.

According to the present invention, the single ring, illustrated at 22, is not closed but is formed to provide a tapered slot 24 of sufficient width to permit the passage of the connecting neck portion 26 of another link therethrough. The ring 12 is small enough to pass bodily through the ring 22, while this connecting neck portion traverses the slot 24. The slot 24 is so formed and tapered that the neck portion 26 of a regulation link will enter the wide end of the slot readily, but will not pass through and emerge from the narrow end of the slot without the exertion of sufficient force upon it to spring the ring 22 open slightly, with the result that when the ring 22 passes into the space between the rings 12 and 14 of the other link it will snap back to its original size, and the corner 28 at the narrow end of the slot in the ring 22 will prevent relative movement of the two links in one direction, while engagement of the ring 22 with the ring 14 of the other link will prevent such movement in the other direction, a permanent, interlocking relation between the parts being thus established.

In assembling a cartridge belt section either regualtion links or my novel link may be used for all except the last link on the endmost cartridge. The cartridges and links are always so assembled that the single ring of the last link is empty and projects from the tail end of the belt. This last or terminal link must be one embodying the present invention, as the link 10 in Fig. 2, where the cartridges 30 and 32 are the last two cartridges of one belt section, while the cartridge 34 is the first one of another section to be joined thereto. In order to join the two sections, it is only necessary to grasp and hold the terminal cartridge 32 with one hand, seize the terminal cartridge 34 of the fresh belt section with the other hand, and thrust the nose of the last-mentioned cartridge through the ring 22 until the ring 12 has passed therethrough and the ring 22 has snapped into place in the space between the rings 12 and 14. This operation can easily be performed almost instantaneously, in a single motion, and, since it is not necessary to align and hold two link elements in exact relation to each other while a third element is threaded through them, the operation is much less difficult and faster than that of connecting two cartridge belt sections, as heretofore practiced, using only regulation links.

If desired, such links as that illustrated and described herein may be colored differently from the regulation links, in order to make it easy to distinguish one from the other quickly. It may, however, be desirable to use only such links as that shown in Fig. 1 in making up the entire cartridge belt, since they can be assembled with the cartridges in exactly the same manner as are the present regulation links, and there is no difference in the cost of manufacture of the two types of links.

Tests have demonstrated that, although a link, in which the single ring can be sprung open widely enough to permit the cartridge to be snapped into it sideways, cannot withstand the pulling force to which the belt is subjected in use without undue stretching, a link having a ring formed as disclosed herein, with a relatively narrow slot at 24, is so nearly equal in rigidity and strength to one in which the ring is practically closed, that there is no noticeable difference in the ability of the two rings to sustain the pull exerted upon them, without any resultant detrimental stretching of the belt.

Having described the invention, what is claimed as new and desired to be secured by Letters Patent of the United States is:

1. A cartridge belt link of resilient material having a central bridge portion, a pair of rings extending from one side thereof, and a single ring extending from the opposite side thereof, the last named ring having a tapered slot the wider end of which is sufficiently wide to permit the ring to be started axially over one of the rings of said pair on an adjacent link and the resiliency of the single ring being sufficient to permit it to be pushed the remainder of the distance thereover and to snap in between the two rings of the pair.

2. A cartridge belt link of resilient sheet metal comprising a pair of spaced apart coaxial, closed rings one of which is large enough to fit the body portion of a cartridge and the other of which is of a size to fit the smaller, neck portion of said cartridge, and a single ring the axis of which is spaced from and parallel to that of the closed rings, said single ring having a tapered slot only the wider end of which is wide enough to permit the single ring to be started axially over the smaller of said closed rings of another similar link while the latter contains a cartridge.

3. A cartridge belt link of resilient material having a central bridge portion, a pair of spaced apart, coaxial, closed rings extending from one side thereof, and a single ring extending from the opposite side thereof, the circumference of the last-named ring being broken only immediately adjacent to said bridge portion by a narrow tapered slot only the wide end of which is sufficiently wide to permit the ring to be started axially over the neck of one of the closed rings of the pair on an adjacent link containing a cartridge, the resiliency of the single ring being sufficient to permit it to be pushed the remainder of the distance thereover and to snap in between the two rings of the pair, and the narrow end of the slot being sufficiently narrow to lock the slotted ring against removal in the reverse direction thereafter.

JOHN M. EWART.